July 24, 1951 W. H. BEAUDOT 2,562,081
POPPED CORN HEATING AND DISPENSING APPARATUS
Filed Jan. 15, 1948 3 Sheets-Sheet 2
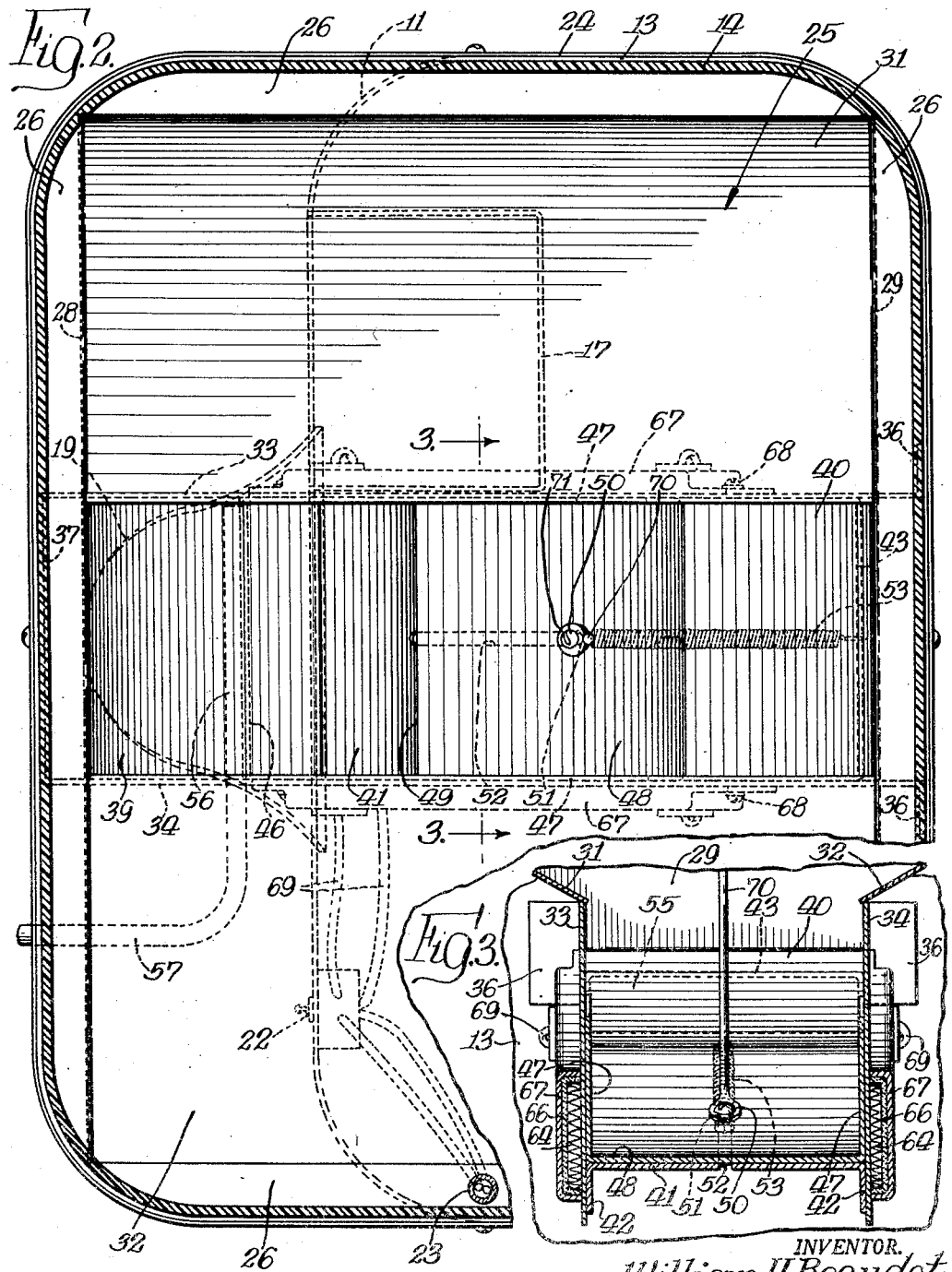
INVENTOR.
William H. Beaudot
BY
Davis, Lindsey, Hibben & Noyes
Attys July 24, 1951 W. H. BEAUDOT 2,562,081
POPPED CORN HEATING AND DISPENSING APPARATUS
Filed Jan. 15, 1948 3 Sheets-Sheet 3
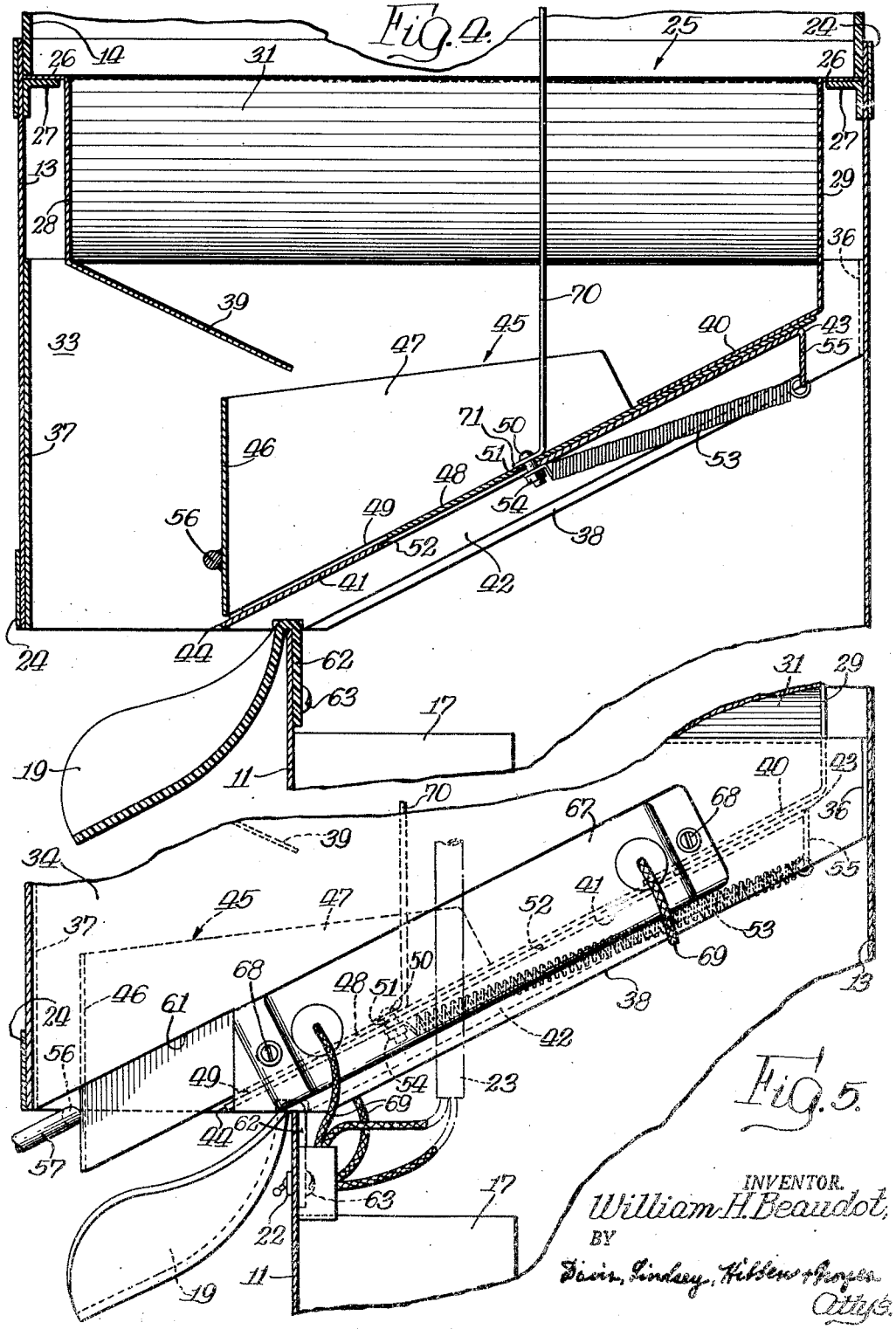
INVENTOR.
William H. Beaudot,
BY
Dawes, Lindsey, Hibben & Noyes
Attys.

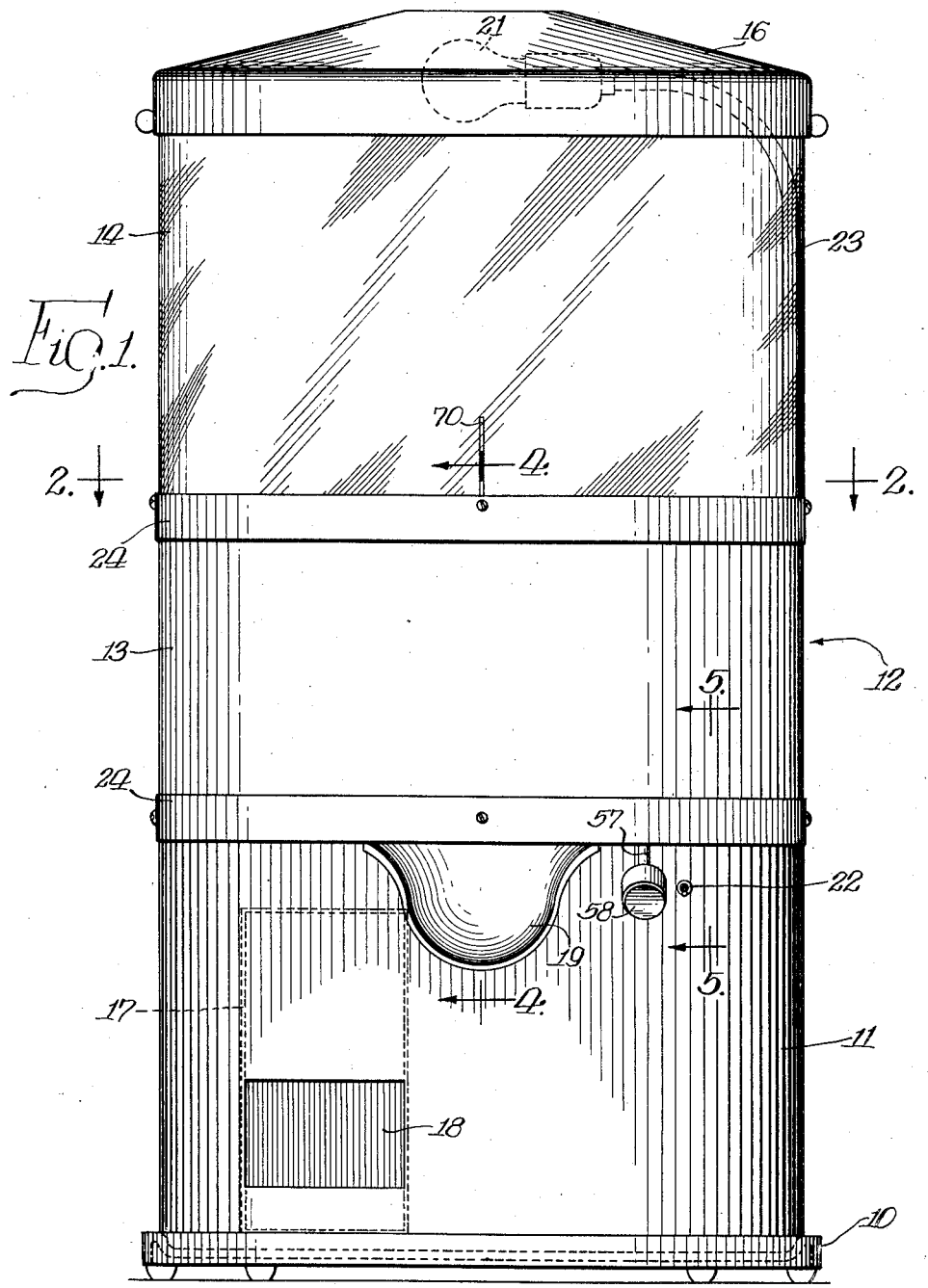

Patented July 24, 1951

2,562,081

UNITED STATES PATENT OFFICE 2,562,081

POPPED CORN HEATING AND DISPENSING APPARATUS

William H. Beaudot, Chicago, Ill.

Application January 15, 1948, Serial No. 2,529

10 Claims. (Cl. 222—146)

1

This invention relates to a dispensing device for solid materials and more particularly to a dispenser for precooked or popped popcorn.

When popcorn is cooked or popped by the application of heat, the individual kernels are everted by the vaporization of contained moisture to form relatively light starchy masses having a volume many times greater than the uncooked popcorn. Each of the lumps or pieces of popped popcorn has a rough irregular outer surface replete with depressions and protuberances. As a result of this irregular surface texture of popped popcorn and also because of its relatively low weight per unit volume, a bulk supply of the cooked material does not have the free-flowing properties which are characteristic of smooth-surfaced solid particles and consequently the popcorn tends to pack or jam during discharge from a gravity flow container or dispenser. As a result of these characteristics of popped corn, no suitable and commercially acceptable dispensers have as yet been available and almost all of the popped corn that is sold from bulk today is dispensed from the bulk bins by means of hand operated dippers or scoops.

Furthermore, in popcorn vending machines or dispensers of the type which do not cook the popcorn but merely contain a supply of precooked popcorn, no satisfactory provision has heretofore been made for maintaining the popcorn at a warm and palatable temperature. As a result, unless the popcorn is freshly cooked, it must be dispensed or sold in an unappealing cold or partially warmed condition.

Although numerous devices are known to the prior art for dispensing subdivided or granular solids in either measured or unmeasured quantities, the vast majority of these devices are not at all suitable for dispensing solid materials in the form of relatively large lumps or particles, particularly where the lumps or particles have rough exterior surfaces and a relatively low bulk density such as in the case of popped popcorn. In many of the prior art dispensers, the flow passageways contain abrupt changes of direction involving sharp corners and narrow restrictions all of which render these devices unsatisfactory for use with lumpy materials which tend to clog under gravity flow conditions.

Certain of the prior art gravity flow devices which are designed to dispense measured or predetermined quantities of material are provided with positive sealing means for closing or sealing off the main supply of material while a measured amount is being discharged from the

2 apparatus. I have found that the dispensers of this type are likewise objectionable for use with solid materials which do not flow readily, especially where the material is in the form of low density lumps such as popped popcorn.

A primary object of the present invention is to provide an inexpensive and easily constructed dispenser of the gravity flow type which is suitable for use with solid materials in relatively large lumps, as distinguished from relatively fine powders or granular solids, particularly where the material has a relatively low bulk density and the lumps have rough and irregular surfaces such as in the case of precooked or popped popcorn.

Another object of the invention is to provide a dispenser for lumpy solid material in which the temperature of the material dispensed may be regulated.

A further object of the invention is to provide a dispenser for use with solid materials in which the material may be controllably discharged from a bulk supply in the dispenser in a relatively free-flowing stream without abrupt changes of direction or other flow restrictive structures within the apparatus.

A still further object of the invention is to provide a dispenser having an inclined, movable chute which is adapted to be moved downwardly during the dispensing operation in the same inclined direction as the other parts of the dispensing mechanism and the flow of the material being dispensed.

Still another object of the invention is to provide a dispenser for popcorn or other lumpy solid material, the dispenser having a movable chute slidable in a stationary guideway and the parts being so arranged that when the movable chute is operated to carry with it a quantity of popcorn to be dispensed, the guideway remains in open connection with a supply bin from which a quantity of popcorn falls into the guideway and is forced into the chute when the chute is returned to its normal position.

An additional object is to provide a dispenser for popcorn or other lumpy solid material, the dispenser having a movable chute adapted to be moved from material receiving position to material dispensing position and the dispensing spout or opening of the machine being adapted to be closed when the chute is in inoperative position and to be in open communication through the chute with a supply bin during the dispensing operation.

A more specific object of the invention is to provide a dispenser for popped popcorn in which the popcorn may be controllably discharged by gravity flow in heated condition and in which obstructions to free flow of the popcorn are substantially avoided.

Other objects and advantages of the invention will become evident hereinafter from the following description thereof and from the accompanying drawings, in which:

Figure 1 is a front elevational view of a dispenser embodying the features of my invention;

Fig. 2 is a horizontal sectional view taken along the line 2—2 of Fig. 1 looking downwardly in the direction of the arrows;

Fig. 3 is a fragmentary vertical sectional view taken along the line 3—3 of Fig. 2 looking rearwardly in the direction of the arrows;

Fig. 4 is a fragmentary vertical sectional view taken along the line 4—4 of Fig. 1 looking in the direction of the arrows; and Fig. 5 is a fragmentary vertical sectional view taken along the line 5—5 of Fig. 1 looking in the direction of the arrows.

Although the invention is hereinafter described primarily in connection with a dispenser for popcorn, it is to be understood that the device may be used generally for many types of subdivided solid material, particularly where the material is in the form of relatively large lumps having a low bulk density and rough outer surfaces. For example, the dispenser of the present invention has been found quite well adapted for use in dispensing shelled peanuts.

Broadly, the dispenser of my invention comprises a housing containing a supply bin and hopper in its upper portion, a discharge outlet in its lower portion, and an inclined, mechanically operable dispensing chute communicating between the hopper and the discharge outlet. The dispensing chute is formed from a stationary inclined slideway and a movable dispensing compartment or scoop slidably disposed on the slideway and adapted to be moved in telescopic relation therewith. When the dispensing compartment is moved upwardly along the slideway, the material to be disposed is scooped up, and when the compartment is slid downwardly along the slideway, an opening in the bottom of the compartment is moved into register with the aforementioned discharge outlet to permit the material to flow by gravity from the apparatus.

Referring to Fig. 1 of the drawing, a popcorn dispenser embodying the features of my invention is illustrated by way of example and comprises a flat bottom tray 10 and an upstanding base portion 11 of substantially rectangular outline above which is a vertical housing, shown generally at 12, which is formed integrally with said base portion 11. The housing 12 is in alignment with the rear and side walls of the base 11 but overhangs or projects forwardly over and beyond the front wall thereof as seen more clearly in Figs. 4 and 5. The housing 12 comprises a lower casing 13 enclosing the operating mechanism of the dispenser, hereinafter described in greater detail, and an upper container or supply bin 14 adapted to hold a bulk supply of popped popcorn and provided at its top with a removable cover 16 for filling. A recess or compartment 17 is provided within the base 11 for holding a supply of paper bags which can be removed therefrom through an opening 18 in the front wall of the base 11. A curved discharge spout 19 projects downwardly from the front bottom edge of the casing 13 for guiding the popped corn into the paper bags which may be held in receiving position therebelow. An electric light bulb 21 is mounted within the cover 16 for illuminating the contents of the bin 14 and is controlled by an electric switch 22 connected therewith by means of electric wiring passing through a conduit 23.

The walls of the bin 14 are preferably formed from a transparent plastic material to permit the contents of the dispenser to be viewed by the prospective purchaser, whereas the cover 16, the base portion 11 and the lower casing 13 enclosing the dispensing mechanism may be formed from a relatively opaque material such as an attractively colored plastic. Peripheral trim strips 24 formed, for example, from a decorative metal may be provided at the juncture between the bin 14 and the casing 13 and around the bottom of the casing 13.

Referring now to Figs. 2–5 inclusive, a hopper of generally rectangular cross-section, shown generally at 25 in Fig. 4, and having a peripheral lip or flange 26 projecting horizontally from the upper edges of the four side walls thereof, is hung or supported within the casing 13 in open communication with the bin 14 by engagement of the flange 26 with a supporting angle iron 27 secured peripherally to the inner faces of the four walls of the casing 13. The hopper 25 comprises a vertical front wall 28, a vertical rear wall 29 which extends downwardly further than the front wall 28, and a pair of oppositely disposed side walls 31 and 32 which slope downwardly and inwardly from the flange 26 toward the center of the casing 13 and terminate in spaced relationship from each other as best shown in Fig. 3.

Extending between the front and rear walls of the casing 13 is a trough-like partitioning member having a generally U-shaped horizontal cross-section, as shown in Fig. 2, and comprising a pair of oppositely disposed, upstanding retaining walls 33 and 34 each secured at one end to the rear wall of the casing 13 by means of a projecting flange 36 and secured at the other end to the front wall of the casing 13 by means of an upright connecting plate 37. The vertical retaining walls 33 and 34 abut and extend downwardly from the lower edges of the sloping hopper side walls 31 and 32, as shown more clearly in Fig. 3, to define an underlying receiving and dispensing trough therebetween adapted to receive the contents of the bin 14 flowing downwardly through the hopper 25. Each of the walls 33 and 34 is of lesser height at the bracket portions 36 adjacent the rear wall of the casing 13 than at the connecting plate 37 adjacent the front wall of the casing 13, the upper edge of each wall being horizontal and the lower edge of each sloping downwardly from back to front as shown more clearly in Figs. 4 and 5. The vertical front and rear walls 28 and 29 of the hopper 25 extend inwardly from their lower edges between the retaining walls 33 and 34 to form inclined plates 39 and 40, respectively, for directing the contents of the bin 14 downwardly into the trough between the walls 33 and 34. The inclined plate 40 also serves as a portion of the bottom of the trough.

Disposed between the vertical retaining walls 33 and 34 in a plane parallel with and spaced below the plate 40 is a flat inclined slideway 41 comprising an inverted channel member having depending sides 42 secured lengthwise to the side walls 33 and 34, the slideway 41 sloping downwardly from its upper or rear edge 43 adjacent the rear hopper wall 29 to its lower or front edge 44 which is opposite the lower edge of the front wall of the casing 13 and in the same horizontal plane therewith.

A reciprocably movable dispensing compartment, chute, or scoop, shown generally at 45 in Figs. 4 and 5, is slidably disposed on the slideway 41 between the retaining walls 33 and 34 in telescoping relation therewith and comprises an upstanding front wall 46, upstanding side walls 47, and a flat bottom wall 48 extending beyond the side walls 47 at the rear of the compartment, this flat rear extension being slidably received between the inclined hopper plate 40 and the flat slideway 41. The sliding fit of this rear extension between the plate 40 and the slideway 41 is sufficiently tight and close to prevent particles of popcorn from passing upwardly therebetween. The bottom wall 48 also is provided with an opening 49 adjacent the front wall 46, and the top and rear of the slidable chute 45 are open to permit the contents of the hopper 25 to be scooped up by the chute 45 upon upward sliding movement thereof along the slideway 41.

The chute 45 is slidably connected to the slideway 41 by means of a guide pin or bolt 50 projecting through an aperture 51 in its bottom wall 48 and thence through an elongated slot 52 extending lengthwise in the slideway 41 thereby limiting the sliding travel of the chute 45 by engagement of the bolt 50 with the opposite ends of the slot 52. A helical tension spring 53, secured at one end to the bolt 50 by means of a nut 54 and at the other end to a flange 55 depending from the rear edge 43 of the slideway 41, urges the dispensing chute 45 upwardly along the slideway 41 to the position shown in Fig. 4 but permits the chute 45 to be moved forwardly and downwardly to dispensing position.

An operating handle is affixed to the dispensing chute 45 by means of a rod having a transverse portion 56 affixed to the front wall 46 and an arm 57 projecting outwardly from beneath the casing 13 and terminating in an operating knob 58. A generally rectangular discharge opening or outlet from the dispenser is defined between the lower edge 44 of the slideway 41 and the lower edge of the front wall of the casing 13, the vertical retaining wall 34 being notched out, as shown at 61 in Fig. 5, to provide a space for movement of the transverse portion 56 of the handle. Upon downward movement of the dispensing chute 45 along the slideway 41 by manipulation of the knob 58, the bottom opening 49 in the chute 45 is brought into register with the dispenser outlet to permit discharge of the contents of the chute into the discharge spout 19 which is secured to the front wall of the base 11 by means of an overhanging bracket portion 62 and a screw 63. As shown in Fig. 5, the lower front end of the chute 45, when in dispensing position, extends through the outlet below the bottom edges of the slideway 41 and the front wall of the casing 13 and at the same time the chute 45 is in open communication with the trough, the hopper 25, and the supply of popped corn in the bin 14.

An elongated electrical resistance heater, shown in Figs. 3 and 5 and comprising a heating element or resistance coil 64 surrounded by an insulating layer 66 and encased in a rectangular housing 67, is secured in an inclined position, paralleling the slope of the slideway 41, to the outer face of each of the vertical retaining walls 33 and 34 by means of a plurality of screws 68. The heating elements 64 are connected with the control switch 22 by means of electric wires 69. Heat from the resistance coils 64 is transmitted by conduction through the vertical walls 33 and 34 to the side walls 47 of the compartment 45 and thence to the contents of the compartment to maintain the popcorn or other material at the desired dispensing temperature. Heat is further transmitted to the walls of the hopper 24 so as to warm somewhat the popcorn between the inclined walls thereof but above the chute 45. It is apparent that the heat is applied primarily to the popcorn in the chute 45 which portion of popcorn is to be first dispensed and therefore should be warmed to the greatest extent.

The dispensing compartment or scoop 45 is normally retained in retracted position at the upper portion of the slideway 41 by means of the spring 53 as shown in Fig. 4. In this retracted inner position the compartment 45 is filled through its open top and rear portions with a quantity of popcorn, or other material which it is desired to dispense, by gravity flow thereof from the supply bin 14 and the connecting hopper 25 which is in open communication at all times with the compartment 45. By pulling the operating knob 58 outwardly and downwardly in the sloping direction of the inclined slideway 41, the dispensing chute 45 is slid along the slideway 41 between the vertical retaining walls 33 and 34 into an extended discharging position, shown in Fig. 5, in which the opening 49 in the bottom of the chute is brought into register with and extends through the discharge outlet whereby the contents of the chute 45 are caused to drop through the opening 49 and the discharge outlet from the dispenser. It is to be noted that the chute 45 is pulled and moves downwardly in the direction of flow of the popcorn, and when the chute 45 is projected through and in register with the dispenser outlet, the popcorn may flow freely out of the chute opening 49 without being obstructed in any manner, its direction of flow not being abruptly changed by the walls of a dispensing tube or passageway. A paper bag or other receiver may be held beneath the spout 19 to receive the material dispensed. Upon release of the knob 58, the spring 53 causes the dispensing chute 45 to return to its normal retracted position and during the upward travel of the chute along the slideway 41 a further quantity of popcorn is scooped up through its open top and rear portions. This further quantity of popcorn drops or flows down within the trough from the hopper 25 immediately upon removal of the chute 45 and its contents to dispensing position, the flow downwardly being insured by the sudden removal of the chute 45 and its contents from supporting position therebelow. Furthermore, the filling of the chute 45 upon its return movement is accomplished by a positive scooping action and reliance solely upon gravity flow of the popcorn for filling the chute 45 upon its return is thereby avoided.

Although my dispensing apparatus is not primarily a device for dispensing a material in measured quantities, it will be evident from the foregoing description of the operation of the dispenser that the downward manual movement of the compartment 45 by manipulation of the knob 58 imparts a certain localized momentum to that portion of the popcorn immediately contained in the compartment. As a result, the first quantity of popcorn issuing from the dispenser outlet tends to be discharged rapidly in a relatively large batch as a result of the combined effects of gravity flow and the kinectic energy imparted by downward travel of the compartment. The downward movement of the popcorn imparted to it by movement of the chute 45 continues in substantially the same direction after the chute 45 reaches its lower position. Thereafter, the popcorn discharges more slowly in a substantially free-flowing stream from the supply bin 14 and the hopper 25 through the dispensing chute 45 and the dispenser outlet, the rate of flow being controllable at the will of the user of the dispenser by moving the chute 45 along the slideway 41 to regulate the degree of alignment or registy between the bottom opening 49 and the outlet of the dispenser. If occasionally the flow of popcorn becomes undesirably slow or if the flow becomes obstructed by momentary packing or clogging, a slight agitation or jiggling motion of the handle knob 58 will readily restore and maintain free-flowing conditions. An upright flexible spring rod 70 having a bent bracket portion 71 at its lower end is secured to the bottom 48 of the scoop 45 by means of the bolt 50 and the nut 54. Upon jiggling movement of the knob 58, the rod 70 functions as an agitator and assists in preventing packing or clogging of the popcorn in the hopper 25.

Although only one preferred embodiment of dispenser containing the features of my invention has been illustrated in the drawings and described in detail hereinabove, it is to be understood that modifications of this structure may be resorted to without departing from the spirit and scope of the invention as defined in the appended claims.

I claim:

1. A dispenser of the class described comprising a supply bin having an outlet at the bottom thereof, structure providing a discharge opening for the dispenser below said bin outlet, and a chute sloping downwardly between said outlet and said discharge opening and comprising a movable member slidably mounted in said chute and adapted to be moved from material receiving position to dispensing position and return, said movable member having an opening in its lower portion adapted to register with said discharge opening when said member is moved downwardly into dispensing position, said chute and movable member being open at their upper portions and in open communication with said bin outlet when said movable member is in receiving and dispensing positions, and the communicating opening between said chute and movable member and the bin outlet being of sufficient extent to permit the passage of material from the bin to said movable member in both receiving and dispensing positions of the latter.

2. A dispenser of the class described comprising a bin having an outlet at the bottom thereof, structure providing a discharge opening for the dispenser below said bin outlet, and a chute sloping downwardly between said outlet and said discharge opening and comprising a movable member slidably mounted in said chute and adapted to be moved from material receiving position to dispensing position and return, said movable member comprising a compartment having front, side and bottom walls but being open at its rear and upper portions, the bottom wall of said compartment being provided with an opening adapted to register with said discharge opening when said compartment is moved downwardly into dispensing position, and said chute and compartment being in open communication with said bin outlet when said compartment is in receiving and dispensing positions.

3. A dispenser of the class described comprising a bin having an outlet at the bottom thereof, structure providing a discharge opening for the dispenser below said bin outlet, and a chute sloping downwardly between said outlet and said discharge opening and comprising a stationary slideway and a movable compartment slidably mounted in said slideway and adapted to be moved downwardly from material receiving position at the upper portion of said slideway to dispensing position and return, said movable compartment having an opening in its lower portion adapted to register with said discharge opening when said compartment is moved downwardly into dispensing position, and said chute and compartment being open at their upper portions and in open communication with said bin outlet when the compartment is in receiving and dispensing positions.

4. A dispenser of the class described comprising a bin having an outlet at the bottom thereof, structure providing a discharge opening for the dispenser below said bin outlet, and a chute sloping downwardly between said outlet and said discharge opening and comprising a stationary portion in constant open communication with said bin outlet and a movable member mounted for telescoping movement relative to said stationary portion and adapted to be moved downwardly from material receiving position at the upper portion of said chute to lowered dispensing position and return, said movable member having a flat bottom wall slidable along said stationary portion and having an opening in its lower portion adapted to register with said discharge opening upon downward movement of said movable member, and said movable member also being open at its top and rear portions whereby, upon upward movement to said material receiving position, a quantity of material is scooped onto said flat bottom wall through said open top and rear portions.

5. A dispenser of the class described comprising a bin having an outlet at the bottom thereof, structure providing a discharge opening for the dispenser below said bin outlet, a chute sloping downwardly between said outlet and said discharge opening and in constant open communication with said outlet and comprising a movable compartment slidably mounted in said chute and adapted to be moved from material receiving position to dispensing position and return, said compartment having upright front and side walls and a flat bottom with an opening in its lower portion adapted to register with said discharge opening when said compartment is moved downwardly into dispensing position, said compartment also being open at its top and rear portions whereby, upon upward movement to said material receiving position, a quantity of material is scooped into said compartment through said open top and rear portions, spring means normally urging said compartment into said material receiving position, and means for moving said compartment into said dispensing position against the action of said spring means.

6. A dispenser of the class described comprising a supply bin having a hopper bottom, structure providing a discharge opening for the dispenser below said bin outlet, a dispensing chute having its upper end disposed adjacent said hopper in open communication therewith and sloping downwardly therefrom toward said discharge opening, and a scoop slidably mounted in said chute in telescoping relation therewith, said scoop having upwardly extending front and side walls, open top and rear portions and a flat bottom with an opening therein, said scoop being movable in said chute from a retracted material receiving position at the upper portion of said chute to an extended dispensing position at the lower portion of said chute, and said opening in the bottom of said scoop being adapted to register with said discharge opening when said scoop is in said extended position.

7. A dispenser of the class described comprising a supply bin, structure providing a discharge opening for the dispenser, an inclined dispensing chute comprising an elongated stationary trough of U-shaped cross section, said trough being in constant open communication at its upper end with said bin and sloping downwardly therefrom to said discharge opening, and a reciprocably movable compartment slidably mounted within said trough and adapted to receive from said bin material to be dispensed, said compartment having front, side, and bottom walls but being open at its rear and upper portions, the bottom wall of said compartment being provided with an opening adapted to register with said discharge opening for discharging material from the dispenser when said compartment is moved downwardly in said trough.

8. A dispenser of the class described comprising a supply bin, structure providing a discharge opening for the dispenser, a hopper below said bin having sloping side walls terminating at their lower edges in substantially vertical retaining walls, said hopper also having front and rear walls sloping inwardly between said retaining walls to define an outlet from the hopper therebetween, an inclined flat slideway having its upper end disposed beneath said outlet in open communication therewith and sloping downwardly therefrom between said retaining walls toward said discharge opening, and a movable compartment slidably mounted on said slideway between said retaining walls, said compartment having front, side, and bottom walls with an opening in the latter adapted to register with said discharge opening when said compartment is moved downwardly along said slideway to dispensing position, and said compartment being open at its rear and upper portions for receiving material from said hopper upon return movement of the compartment upwardly along said slideway.

9. A dispenser for dispensing solid materials in heated condition comprising a supply bin, structure providing a discharge outlet for the dispenser, a dispensing chute communicating between said bin and said outlet, said chute comprising a stationary slideway having upstanding side walls and a movable compartment having upstanding side walls and being slidably disposed in said slideway between and in contact with the side walls thereof, said slideway and compartment being formed of heat conducting material and defining a receptacle in which popcorn next to be dispensed may be warmed and heating elements disposed adjacent said slideway and side walls for warming the slideway and compartment and the material to be dispensed through said chute.

10. A dispenser of the class described comprising a supply bin having an outlet at the bottom thereof, structure providing a discharge opening for the dispenser below said bin outlet, and a dispensing chute communicating between said outlet and said discharge opening and comprising a movable member slidably mounted in said chute and adapted to be moved from material receiving position to dispensing position and return, said movable member having an opening in its lower portion adapted to register with said discharge opening when said member is moved into dispensing position, said chute and movable member being open at their upper portions and in open communication with said bin outlet when said movable member is in receiving and dispensing positions.

WILLIAM H. BEAUDOT.

REFERENCES CITED

The following references are of record in the file of this patent:

UNITED STATES PATENTS

| Number | Name | Date |
|---|---|---|
| 753,597 | Long | Mar. 1, 1904 |
| 1,471,621 | McCord | Oct. 23, 1923 |
| 1,980,057 | Horkavi | Nov. 6, 1934 |
| 2,201,655 | Srodulski | May 21, 1940 |

FOREIGN PATENTS

| Number | Country | Date |
|---|---|---|
| 1,158 | Great Britain | Jan. 15, 1912 |